CARL J. BLOM
JAMES M. GAYLORD
INVENTORS

BY Lyon & Lyon
ATTORNEYS

CARL J. BLOM
JAMES M. GAYLORD
INVENTORS

BY Lyon r Lyon

ATTORNEYS

Patented Aug. 31, 1954

2,687,695

UNITED STATES PATENT OFFICE 2,687,695

MOTOR PUMP

Carl J. Blom and James M. Gaylord, San Marino, Calif., assignors to Byron Jackson Co., Vernon, Calif., a corporation of Delaware Application December 12, 1949, Serial No. 132,514

28 Claims. (Cl. 103—87)

This invention relates to motor pumps and particularly to motor pumps of the "wet" type; that is motor pumps wherein the motor is divided into a rotor compartment to which the pump liquid has access, and a stator compartment isolated from the pump liquid.

Motor pumps of this general type are particularly adaptable where an oil-filled motor with shaft seal is unfeasible because of conditions which preclude the use of either a mechanical shaft seal or a mercury seal. Typical of such conditions are high or very low temperature, corrosive pump liquid, pump liquid emulsifiable with mercury, and the necessity of avoiding any contamination of pump liquid by motor oil.

On the other hand, in the "wet" type motor pumps which have been devised in the past, certain disadvantages have been apparent. Since the stator portion of the motor must necessarily be isolated from the rotor portion thereof, a stator liner or housing must be provided, and since this liner must, of course, be thin, a difficulty exists in maintaining the pressures on both sides of said liner equal under all conditions to prevent distortion of the liner and consequent interference with the operation of the motor. Prior devices have suggested the use of bellows of metallic or rubber construction. Since the bellows must be immersed in one of the liquids and have its interior in communication with the other liquid, this necessitates placing the bellows within the motor housing. Since the bellows must be within the motor housing, this means that the size of the motor housing must be substantially increased. Further, the internal stresses in a bellows, when expanded or contracted from its normal condition, result in at least a small pressure differential and preclude full pressure equalization. This is particularly objectionable in conjunction with a thin stator liner which is incapable of withstanding any appreciable pressure differential without changing its shape. Finally, a bellows, particularly of rubber construction, is subject to deterioration at high temperatures and also when used with certain types of liquid.

Again difficulty is often occasioned with the "wet" type motor pump in providing for sufficient cooling means for the stator, for the rotor and for the bearings thereof. Prior devices have made provision for filling the stator compartment with oil, and for circulating pump liquid through rotors and bearings, but prior to the instant invention it is believed that no sufficient means have been designed for removing the heat from such circulating pump liquid or from the stator oil itself.

Consequently, it is the object of the instant invention to provide a motor pump of the "wet" type wherein the use of a pressure equalizing bellows is avoided.

It is the further object of this invention to provide such a motor pump wherein means is provided for pressure equalization between stator oil and pump liquid, wherein absolute pressure equalization is obtained, and wherein no enlargement of the motor pump housing is required.

Again it is the object of the instant invention to provide sufficient cooling means for the stator, for the rotor, and for the bearings of the unit, such structure enabling the efficient removal of heat from these elements.

Yet another object of the invention is to provide such cooling means of such nature as to permit of an extremely compact motor pump unit, indeed the structure providing one means with the dual function of dissipating heat from the stator, and of dissipating heat from the circulating pump liquid cooling the rotor and the bearings.

Other objects and advantages of the present invention will become apparent from the following detailed description of what is now considered a preferred embodiment thereof, reference being had to the accompanying drawings wherein.

Figure 1:
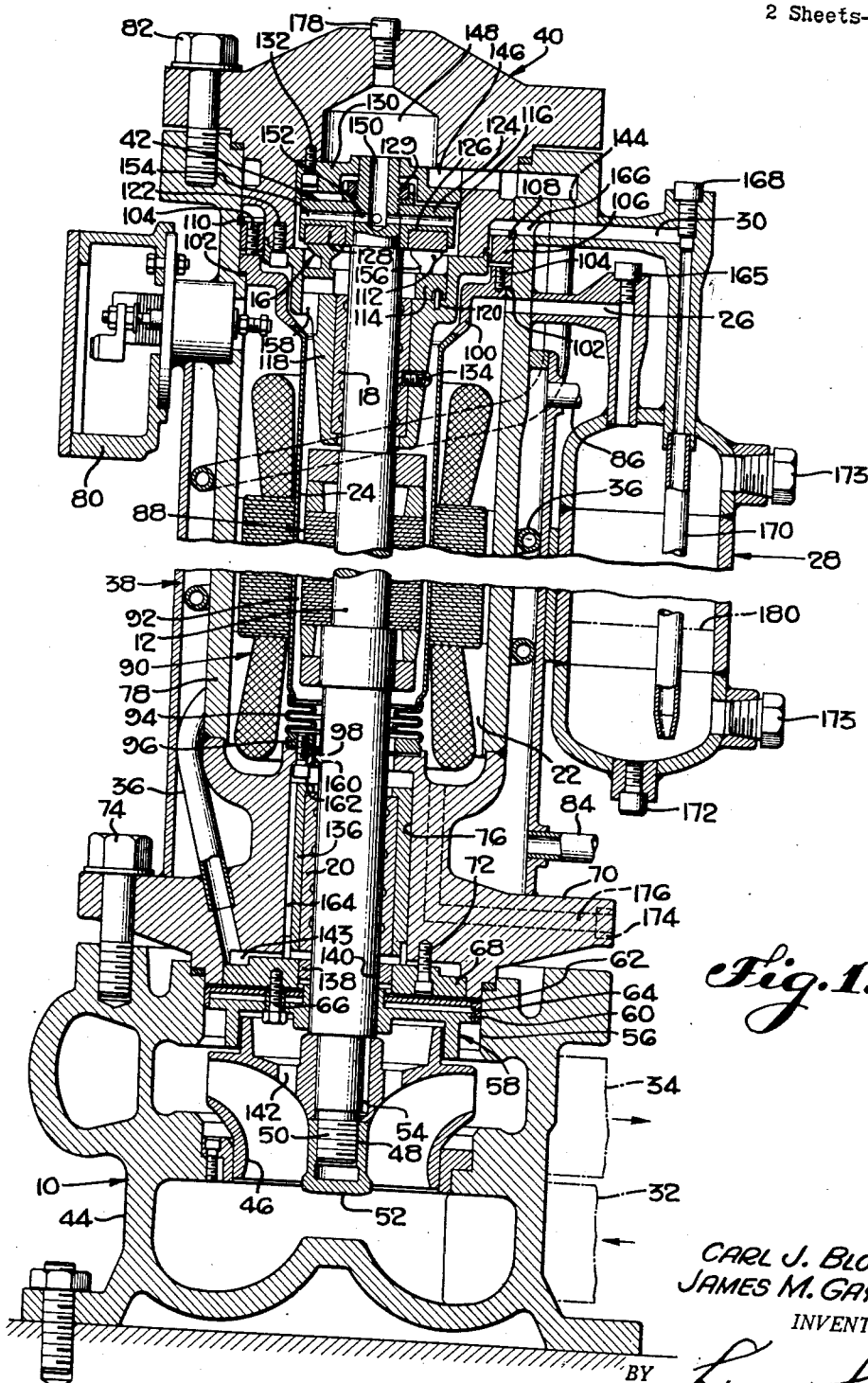
Figure 1 shows a "wet" type motor pump in section, incorporating the features of the instant invention.
Figure 2:
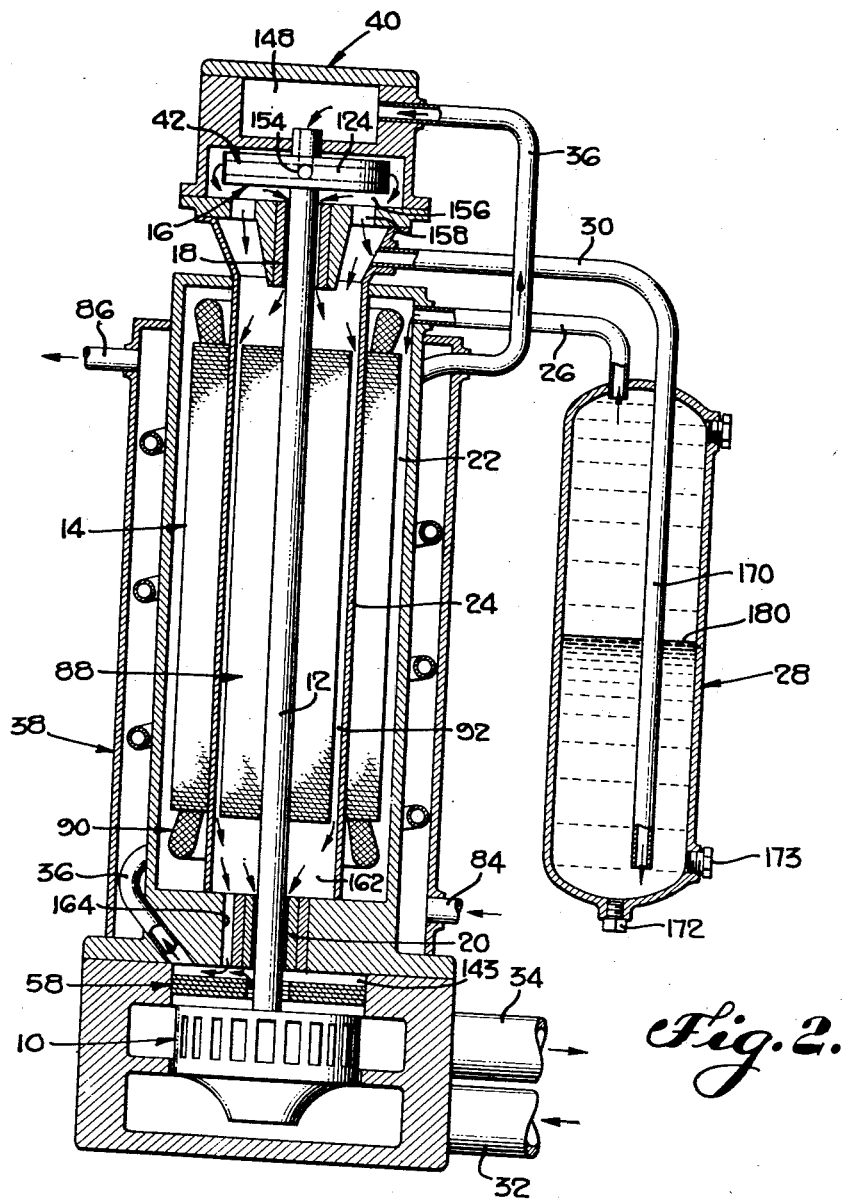
Figure 2 shows a schematic view, partly in section, of a motor pump illustrating the operation of the invention.

Referring to the drawings and particularly to the schematic Figure 3, the combination includes generally a pump 10 driven by a motor shaft 12, which is in turn driven by a motor 14. The shaft 12 is provided with a thrust bearing 16, not shown in Figure 3, and with upper radial bearings 18 and lower radial bearings 20. The stator portion of the motor is isolated in a compartment 22 by a liner 24, which compartment connects through a conduit 26 to a balance chamber 28. A conduit 30 leads from said balance chamber 28 to the rotor and bearing section of the unit.

In operation the pump 10, which is of the centrifugal type, is driven by the shaft 12, pump liquid being received through the inlet 32 and discharging from the outlet 34. The suction side of the pump is in communication with a tubing coil 36, which passes through a water or other cooling liquid jacket 38 to the motor pump head 40, whence it passes through a distributor 42 and through the various bearings 16, 18 and 20, as shown in Figure 3, back to the tubing coil 36. The distributor 42 is keyed to the shaft 12 and hence provides an impeller to maintain circulation of the pump liquid past and through the various bearings and through the rotor gap. During operation of the pump, the stator oil within the stator compartment 22 will, of course, expand and contract due to temperature gain and loss. Such contraction or expansion would, of course, affect the liner 24 which is necessarily thin, were it not for the balance chamber 28, the upper portion of which is filled with the stator oil and the lower portion of which is filled with pump liquid. Expansion of the stator oil increases the volume of stator oil in the balance chamber, causing it to displace pump liquid from the balance chamber through the rotor compartment and into the pump, the pressure of the stator oil being all the while equalized and thus preventing distortion of the liner 24 and consequent interference with the operation of the motor. Again during operation of the pump, the pump liquid circulating in the bearings and past the rotor is subject to a considerable rise in temperature, and the heat within said pump liquid must be removed lest the bearings fail. At the same time it is desirable that heat be likewise removed from the stator oil. This is accomplished by provision of the jacket 38 which contains water or other cooling liquid from a separate source, said cooling liquid contacting the walls of the stator compartment 22 and at the same time surrounding the tubing coil 36 which circulates the pump liquid. Such jacket accomplishes the dual function of providing a heat transfer means for the bearing lubricating pump liquid, and for the stator oil of the stator compartment 22.

It will be noted that by the above combination fully adequate lubricating and cooling of rotor and bearings is accomplished, an isolated oil filled stator compartment is provided, and absolute pressure equalization is accomplished across the liner 24. The use of a pressure equalizing bellows with its attendant difficulties is avoided. Further, heat transfer from the pump liquid in the motor is accomplished through the jacket 38 and tubing coil 36. Finally, heat transfer from the stator compartment oil is likewise, and simultaneously, accomplished by virtue of the jacket 38. This results in an extremely compact and efficient unit.

Referring now particularly to Figure 1, the pump 10 includes a housing 44 enclosing an impeller 46 rotating within the said housing. The impeller 46 is provided with a bore 48 which receives the lower reduced diameter portion 50 of the shaft 12. The reduced portion 50 of the shaft is threaded to cooperate with an internally threaded impeller nut 52, and a key 54 locks the shaft 12 against rotation relative to the impeller.

An opening 56 at the uppermost portion of the pump housing 44 is adapted to receive a heat insulating assembly 58. Such assembly comprises two spaced members 60 and 62 which sandwitch silicon glass fiber sheets 64, or other similar material having heat insulating properties. Stud bolts 66 attach the aforesaid assembly 58 to a circular member 68, which is attached to the motor base 70 by bolts 72.

Such motor base 70 is affixed to the pump housing 44 by bolts 74, only one of which is shown. The motor base is provided with a bore 76 to receive shaft, bearings, and the like, later to be described, and welded thereto is a cylindrical motor housing 78. The motor housing 78 encloses shaft, rotor, stator and the upper bearings and associated elements, later to be described. Closure means for the housing 78 are provided by a pump head 40, which is secured to the said housing by bolts 82, only one of which is shown. Surrounding the motor housing is the water jacket 38, which is welded to the motor base 70 and to the said motor housing 78, and to a terminal box 80 which provides an inlet for the necessary electrical cables and conduits for the motor. An inlet 84 and an outlet 86 are provided for the said water jacket 38 to permit the circulation of water or other cooling liquid therethrough. Affixed to the said water jacket 38 is the balance chamber 28, the operation to be described in detail hereinafter.

Within the motor housing 78 is the usual rotor 88 and stator 90. Separating said rotor and said stator in such manner as to provide the stator compartment 22 is the thin walled cylindrical liner 24, which liner is preferably of stainless steel or other suitable material, having the necessary corrosion-resistant and magnetic properties. The liner extends through the rotor gap 92 and is secured at its lower end to a metallic bellows 94, which in turn is attached to a plate 96 secured by the bolt 98 to the motor base 70. Such bellows provides an axially resilient connection for one end of the liner to compensate for differential thermal expansion of the said liner and the housing 78. At its upper end, the liner 24 is secured, as by welding, to an adapter 100. The adapter 100 is provided with a shoulder which engages a gasketed seat 102 in the upper portion of the housing 78, the adapter being forced tightly against the said seat 102 by set screws 104 threaded in a thrust ring 106. The upper surface of the said thrust ring 106 bears against a snap ring 108, which seats in a groove 110 in the inner wall of the housing 78. It will thus be seen that the liner cooperates with the motor housing 78 and the motor base 70 to provide a fluid tight stator compartment 22. An oil having the proper dielectric properties is used to fill this stator compartment wherein it serves to carry heat from the stator windings to the housing 78, whence such heat is removed by the liquid circulating in the jacket 38. As will later be shown in detail, the stator oil also serves in cooperation with the balance chamber 28 to serve as a pressure balancing medium to equalize the pressures in both sides of the liner 24.

The weight of the shaft 12, the impeller 46, and the rotor 88, and the downward hydraulic thrust developed by the pump when in operation are carried by the thrust bearing generally designated 16. Such thrust bearing is of the pivoted shoe axial thrust type and, as shown here, comprises an annular series of bearing shoes 112 formed integral with a base plate 114 through pedestal portions 156, which permit the shoes to tilt universally. The base plate 114 is carried within a bearing support member 118, and is locked against relative rotation therewith by a pin 120. The bearing support member 118 is secured to the pump head 40 by bolts 122. Secured to the shaft 12 is a thrust disk 124, which has a downwardly facing annular groove 126, seating an annulus 128 of carbon or other bearing material of suitable composition to cooperate with the shoes 112 against which the annulus bears. The thrust disk 124 is held in place on the shaft 12 by a nut 129, and upper movement of the shaft is prevented by an upper bearing plate 130, mounted slightly above the thrust disk 124 and secured to the pump head 40 by bolts 132. In addition to serving as a thrust bearing element, the thrust disk 124 also serves as a distributor and impeller element for circulating pump liquid through the bearings and rotor in a manner to be described hereinafter.

To maintain the shaft in proper alignment, there is provided the conventional upper radial bearing 18 within the bearing support member 118 and secured thereto by a stud bolt 134 while the lower radial bearing 20 is secured within the bore 76 of the motor base 70 by a retainer 136. Additionally, a short sleeve bearing 138 is also secured within the bore 140 of the circular member 68.

It will be noted that no seal exists in the structure above-described between the pump 10 and the interior of the motor housing 78, and indeed the "wet" type motor pump contemplates that the rotor section of the motor housing be filled with the pump liquid. Communication between the rotor section of the motor and the suction side of the pump is maintained through the orifices 142 of the impeller 46, through the annular space between the shaft 12 and the member 60, through the annular space 143 between circular member 68 and the motor base 70, through the tubing coil 36 which passes through the jacket 38 and is secured in a bore 144 in the upper portion of the motor housing 78, through a horizontal passage 146 in the pump head to a bore 148 in the said pump head, and to the distributor 42. The distributor 42 comprises a short central passage 150 in the upper end of the shaft 12, which communicates with four transverse bores 152 aligned with bores 154 in the thrust disk 124. Since such thrust disk is locked to the shaft 12, rotation of said shaft causes said bored thrust disk to act as a small centrifugal pump forcing pump liquid into the annular passage 116 existing outside the thrust bearing assembly. Since upward flow of pump liquid is blocked by the underside of upper bearing plate 130, it flows inwardly between the bearing shoes 112 and between the bearing faces of the shoes and the annulus 128. Most of the pump liquid then flows through a vertical passage 158 and hence through the rotor gap 92, but a certain amount enters the slight clearance existing between the inner surface of upper radial bearing 18 and the shaft 12, flowing downwardly therein to lubricate and to cool this bearing. The pump liquid flows through the rotor gap, through the bellows 94 and through bore 160 to the annular space 162 in the bore 76 of the motor base 70. From such space most of the liquid proceeds through the vertical passage 164 in said motor base 70, into the annular space 143 and hence back to the tubing coil 36. Some of the liquid, however, enters the annular clearance between the shaft 12 and the lower radial bearing 20, whence it passes into the annular space 143 after cooling and lubricating said bearing.

As is apparent from the foregoing description, two bodies of liquid normally subject to a pressure differential exist on either side of the liner 24. In order to avoid this pressure differential, provision is made by virtue of the balance chamber 28 to equalize the said pressures. Thus the conduit 26 which receives air bleed-off screw 165 leads from the stator compartment 22 to the upper portion of said balance chamber 28, which balance chamber may comprise, as here shown, three welded sections. Likewise the conduit 30 leads from a bore 166 communicating with the pump liquid side of the stator liner 24 to the said balance chamber 28. Such conduit receives the air bleed-off screw 168 and at its terminus receives a tube 170 which projects into the lower portion of said balance chamber 28. Said balance chamber is provided with a drain plug 172 and fittings 173 to which a sight glass may be connected if desired.

In readying the motor pump for operation, the stator compartment is first filled with a stator oil through the plug 174 and a conduit 176 in the motor base 70, such filling being continued until the balance chamber is substantially filled through the conduit 26 with stator oil, the air bleed-off screw 165 being opened to permit the escape of entrapped air. Thereafter, the pump 10 is subjected to the fluid to be pumped, i. e., the pump liquid which fills the rotor and bearing section of the motor pump passing as aforesaid through the tubing coil 36 to the pump head bore 148 and down through the distributor 42. The pump liquid may also rise into the rotor and bearing section through the vertical passage 164 or through the bearing annulus. Entrapped air in this section and within the pump head is bled off by releasing the air bleed-off screw 178. When the pump is filled with the pump liquid, such liquid overflows into the balance chamber through the conduit 30, entrapped air in such conduit being bled off by releasing the air bleed-off screw 168, and displaces stator oil through the air bleed-off screw 165, which is removed at this time. When the interface 180 between the stator oil and the pump liquid within the balance chamber 28 reaches the middle section of the said balance chamber, the screw 165 is replaced and the screws 168 and 178 tightened. Thus is established an absolute pressure transfer means which insures that any rise or lowering of pressure within the rotor and bearing section will be met by a corresponding increase or decrease within the stator compartment. The motor pump may now be placed in operation and, as hereinbefore described, the distributor 42 maintains a circulation of pump liquid within the rotor and bearing section which cools and lubricates the bearings and the rotor. As operation of the motor pump continues the stator oil will gradually become heated and expand, thus lowering the interface 180 until it reaches an equilibrium position. As such interface moves downwardly a proportionate amount of pump liquid is displaced from the lower portion of the balance chamber 28 through conduit 26. Conversely, when the motor pump is shut off, the stator oil will cool and contract. When this occurs, the interface 180 again rises, pump liquid being drawn into the lower portion of the balance chamber 28 through the conduit 30. Thus not only is the balance chamber 28 effective for providing pressure balance, but in this way it operates as an expansion chamber for the stator oil.

Of course, during operation of the motor pump, cooling liquid is continuously circulated through the jacket 38. Such cooling liquid passes over the wall of the motor housing 78 and removes heat from the stator and stator oil. At the same time such circulating cooling liquid passes over the tubing coil 36, which is circulating the rotor and bearing lubricating and cooling pump liquid, removing heat from such liquid and thus acting as a simultaneous heat transfer means for both the circulating pump liquid and for the stator oil.

It will be apparent that once the rotor and bearing section of the motor has been filled with pump liquid, the only subsequent interchange of pump liquid between such section and the pump chamber will be the relatively small amount of pump liquid moving into or out of the pump chamber because of thermal expansion or contraction of the stator oil and of the pump liquid circulated through the rotor and bearing section. This interchange occurs only during the warming-up period after starting the motor pump, and during the cooling-off period after the motor pump is stopped. During normal running conditions after temperature equilibrium has been established, no interchange of pump liquid between the rotor and bearing section and the pump chamber takes place. Accordingly, assuming that the heat insulating asembly 59 is effective to substantially prevent heat transfer from the pump liquid in the pump chamber to the pump liquid in the space 143 immediately above the heat insulating assembly, the equilibrium temperature established in the motor will be independent of the temperature of the pump liquid. The motor pump is thus adaptable to pumping liquids at extremely high temperatures, without developing an abnormally high temperature in the motor.

While there has been described what is at present considered a preferred embodiment of the present invention, it will be apparent to those skilled in the art that various modifications and changes may be made without departing from the essence of the invention, and it is intended to cover herein all such modifications and changes as come within the true scope and spirit of the appended claims.

We claim:

1. An electric motor including in combination: a housing having a thin walled partition defining separate rotor and stator compartments, said rotor compartment having fluid communication with a body of exterior liquid and said stator compartment containing a body of dielectric liquid; and a closed chamber having fluid communication with said rotor compartment and said stator compartment wherein the pressures of said dielectric liquid and said exterior liquid are in pressure transfer relation to eliminate any pressure differential across said partition.

2. An electric motor including in combination: a housing having a thin walled partition defining separate rotor and stator compartments, said rotor compartment having fluid communication with a body of exterior liquid and said stator compartment containing a body of dielectric liquid; a shaft within said housing; a rotor mounted on said shaft and bearings within said rotor compartment supporting said shaft; an impeller element secured on said shaft within said rotor compartment to circulate said exterior liquid within said rotor compartment; and a closed chamber having fluid communication with said rotor compartment and said stator compartment wherein the pressures of said dielectric liquid and said exterior liquid are in pressure transfer relation to eliminate pressure differential across said partition.

3. An electric motor including in combination: a housing having a thin walled partition defining separate rotor and stator compartments, said rotor compartment having fluid communication with a body of exterior liquid, said stator compartment containing a body of dielectric liquid; a shaft within said rotor compartment, a rotor carried by said shaft; bearings within said rotor compartment supporting said shaft, said bearings including an axial thrust bearing having a thrust disk secured to said shaft to rotate therewith, said thrust disk having radially extending ports therein and constituting an impeller element connected to said shaft to circulate said exterior liquid throughout said rotor compartment; and a closed pressure chamber in fluid communication with both said rotor compartment and said stator compartment wherein the pressures of said dielectric liquid and said exterior liquid are in pressure transfer relation to eliminate pressure differential across said partition.

4. An electric motor including in combination: a housing having a thin walled partition defining separate rotor and stator compartments, said rotor compartment having fluid communication with a body of exterior liquid, said rotor compartment containing a body of dielectric liquid; a closed chamber in fluid communication with said rotor compartment and said stator compartment wherein the pressures of said dielectric liquid and said exterior liquid are in pressure transfer relation to eliminate any pressure differential across said partition; a jacket surrounding said housing to receive a circulating heat exchange liquid in contact with the outer wall of said stator compartment; and a heat exchange coil within said jacket, said heat exchange coil being included in a circulation path for liquid in said rotor compartment.

5. An electric motor including in combination: a housing having a thin walled partition defining separate rotor and stator compartments, said rotor compartment having fluid communication with a body of exterior liquid, said stator compartment containing a body of dielectric liquid; shafting extending from said pump into said rotor compartment and carrying a rotor; bearings within said rotor compartment supporting said shafting; an impeller element secured to said shafting within said rotor compartment to circulate said exterior liquid within said rotor compartment; a closed chamber in fluid communication with said rotor compartment and said stator compartment wherein the pressures of said dielectric liquid and said exterior liquid are in pressure transfer relation to eliminate pressure differential across said partition; a jacket surrounding said housing to receive a circulating heat exchange liquid in contact with the outer wall of said stator compartment; and a heat exchange coil within said jacket, said heat exchange coil being included in the circulation path of said exterior liquid in said rotor compartment.

6. An electric motor including in combination: a housing having a thin walled partition defining separate rotor and stator compartments, said rotor compartment having fluid communication with a body of exterior liquid, said stator compartment containing a body of dielectric liquid; a closed chamber in fluid communication with both said rotor compartment and said stator compartment wherein said exterior liquid and said dielectric liquid are in pressure transfer relation to eliminate any pressure differential across said partition; a shaft within said rotor compartment; a rotor carried by said shaft and bearings within said rotor compartment for supporting said shaft, one of said bearings being an axial thrust bearing having a thrust disk secured to said shaft to rotate therewith, said thrust disk having radially extending ports therein to constitute an impeller element adapted to circulate said exterior liquid throughout said rotor compartment; a jacket surrounding said housing adapted to receive a circulating heat exchange liquid in contact with the outer wall of said stator compartment; and a heat exchange coil within said jacket, said coil being included in the circulation path of said exterior liquid in said rotor compartment.

7. An electric motor including in combination: a housing having a thin walled partition defining separate rotor and stator compartments, said rotor compartment containing a coolant liquid and being in fluid communication with a body of exterior liquid and said stator compartment containing a body of dielectric liquid and a vertically disposed cylindrical chamber having fluid communication at its top with said stator compartment and at its bottom with said rotor compartment wherein the pressures of said dielectric liquid and said coolant liquid are in pressure transfer relation to eliminate any pressure differential across said partition.

8. An electric motor including in combination: a housing having a thin walled partition defining separate rotor and stator compartments, said rotor compartment having fluid communication with a body of exterior liquid and said stator compartment containing a body of dielectric liquid; a shaft within said rotor compartment; a rotor carried by said shaft; bearings within said rotor compartment supporting said shaft; an impeller element connected to said shaft to circulate said exterior liquid throughout said rotor compartment; and a vertically disposed closed cylindrical chamber having fluid communication at its top with said stator compartment and at its bottom with said rotor compartment wherein the pressures of said dielectric liquid and said exterior liquid are in pressure transfer relation to eliminate pressure differential across said partition.

9. An electric motor including in combination: a housing having a thin walled partition defining separate rotor and stator compartments, said rotor compartment having fluid communication with a body of exterior liquid, said stator compartment containing a body of dielectric liquid; a vertically disposed closed cylindrical chamber having fluid communication at its top with said stator compartment and at its bottom with said rotor compartment wherein the pressures of said dielectric liquid and said exterior liquid are in pressure transfer relation to eliminate any pressure differential across said partition; a jacket surrounding said housing to receive a circulating heat exchange liquid in contact with the outer wall of said stator compartment; and a heat exchange coil within said jacket, said heat exchange coil being included in a circulation path for exterior liquid in said rotor compartment.

10. An electric motor including in combination: a housing having a thin walled partition defining separate rotor and stator compartments, said rotor compartment having fluid communication with a body of exterior liquid, said stator compartment containing a body of dielectric liquid; a vertically disposed closed cylindrical chamber having fluid communication at its top with said stator compartment and at its bottom with said rotor compartment wherein the pressures of said dielectric liquid and exterior liquid are in pressure transfer relationship to eliminate any pressure differential across said partition; a shaft within said housing; a rotor mounted on said shaft and bearings within said rotor compartment for supporting said shaft; an impeller element secured on said shaft within said rotor compartment adapted to circulate said exterior liquid within said rotor compartment; and a jacket surrounding said housing adapted to receive a circulating heat exchange liquid in contact with the outer wall of said stator compartment; and a heat exchange coil within said jacket, said heat exchange coil being included in the circulation path of said exterior liquid in said rotor compartment.

11. An electric motor including in combination: a housing having a thin walled partition defining separate rotor and stator compartments, said rotor compartment having fluid communication with a body of exterior liquid and said stator compartment containing a body of dielectric liquid; a shaft within said rotor compartment; a rotor carried by said shaft; bearings within said rotor compartment supporting said shaft, said bearings including an axial thrust bearing having a thrust disk secured to said shaft to rotate therewith, said thrust disk having radially extending ports therein to constitute an impeller element to circulate said exterior liquid throughout said rotor compartment; a vertically disposed closed cylindrical chamber having fluid communication at its top with said stator compartment and at its bottom with said rotor compartment wherein the pressures of said dielectric liquid and said exterior liquid are in pressure transfer relation to eliminate pressure differential across said partition; a jacket surrounding said housing to receive a circulating heat exchange liquid in contact with the outer wall of said stator compartment; and a heat exchange coil within said jacket, said heat exchange coil being included in the circulation path of said exterior liquid in said rotor compartment.

12. An electric motor including in combination: a housing having a thin walled partition defining separate rotor and stator compartments, said rotor compartment having fluid communication with a body of exterior liquid, said stator compartment containing a body of dielectric liquid; a shaft within said rotor compartment; a rotor carried by said shaft and bearings within said rotor compartment supporting said shaft, said bearings including an axial thrust bearing having a thrust disk secured to said shaft to rotate therewith, said thrust disk having radially extending ports therein to constitute an impeller element to circulate said exterior liquid throughout said rotor compartment.

13. An electric motor including in combination: a housing having a thin walled partition defining separate rotor and stator compartments, said rotor compartment having fluid communication with a body of exterior liquid and said stator compartment containing a body of dielectric liquid; a shaft within said housing; a rotor mounted on said shaft and bearings within said rotor compartment supporting said shaft; an impeller element secured on said shaft within said rotor compartment to circulate said exterior liquid within said rotor compartment; a jacket surrounding said housing to receive a circulating heat exchange liquid in contact with the outer wall of said stator compartment; and a heat exchange coil within said jacket, said heat exchange coil being included in the circulation path of said exterior liquid in said rotor compartment.

14. An electric motor including in combination: a housing having a thin walled partition defining separate rotor and stator compartments, said rotor compartment having fluid communication with a body of exterior liquid and said stator compartment containing a body of dielectric liquid; a shaft within said rotor compartment; a rotor carried by said shaft and bearings within said rotor compartment supporting said shaft, said bearings including an axial thrust bearing having a thrust disk secured to said shaft to rotate therewith, said thrust disk having radially extending ports therein to constitute an impeller element to circulate said exterior liquid throughout said rotor compartment; a jacket surrounding said housing to receive a circulating heat exchange liquid in contact with the outer wall of said stator compartments; and a heat exchange coil within said jacket, said heat exchange coil being included in the circulation path of said exterior pump liquid in said rotor compartment.

15. A motor pump including in combination: a pump section having means for connection with an exterior pump liquid; a motor housing having a thin walled partition defining separate rotor and stator compartments, said rotor compartment having fluid communication with said pump section, said stator compartment containing a body of dielectric liquid; and a closed chamber in fluid communication with both rotor compartment and stator compartment wherein the pressures of said dielectric liquid and said exterior liquid are in pressure transfer relation to eliminate any pressure differential across said partition.

16. A motor pump including in combination: a pump section having means for connection with an exterior pump liquid; a pump in said pump section; a motor housing having a thin walled partition defining separate rotor and stator compartments, said rotor compartment having fluid communication with said pump section, said stator compartment containing a body of dielectric liquids; shafting extending from said pump into said rotor compartment and carrying a rotor; bearings within said rotor compartment supporting said shafting; an impeller element secured to said shafting within said rotor compartment to circulate said exterior liquid within said rotor compartment; and a closed chamber in fluid communication with both said rotor compartment and said stator compartment wherein the pressures of said exterior liquid and said dielectric liquid are in pressure transfer relation to eliminate pressure differential across said partition.

17. A motor pump including in combination: a pump section having means for connection with an exterior pump liquid; a pump in said pump section; a motor housing having a thin walled partition defining separate rotor and stator compartments, said rotor compartment having fluid communication with said pump section, said stator compartment containing a body of dielectric liquid; shafting extending from said pump into said rotor compartment; a rotor carried by said shafting; bearings within said rotor compartment supporting said shafting, said bearings including an axial thrust bearing having a thrust disk secured to said shafting to rotate therewith, said thrust disk having radially extending ports therein to constitute an impeller element to circulate said exterior liquid throughout said rotor compartment; and a closed chamber having fluid communication with said rotor compartment and said stator compartment wherein the pressures of said dielectric liquid and said exterior liquid are in pressure transfer relation to eliminate any pressure differential across said partition.

18. A motor pump including in combination: a pump section having means for connection with an exterior pump liquid; a motor housing having a thin walled partition defining separate rotor and stator compartments, said rotor compartment having fluid communication with said pump section, said stator compartment containing a body of dielectric liquid; a closed chamber in fluid communication with said rotor compartment and said stator compartment wherein the pressures of said dielectric liquid and said exterior pump liquid are in pressure transfer relation to eliminate any pressure differential across said partition; a jacket surrounding said housing to receive a circulating heat exchange liquid in contact with the outer wall of said stator compartment; and a heat exchange coil within said jacket, said heat exchange coil being included in a circulation path for exterior liquid in said rotor compartment.

19. A motor pump including in combination: a pump section having means for connection with an exterior pump liquid; a pump in said pump section; a motor housing having a thin walled partition defining separate rotor and stator compartments, said rotor compartment having fluid communication with said pump section, said stator compartment containing a body of dielectric liquid; shafting extending from said pump into said rotor compartment and carrying a rotor; bearings within said rotor compartment supporting said shafting; an impeller element secured to said shafting within said rotor compartment to circulate said exterior liquid within said rotor compartment; a closed chamber having fluid communication with said rotor compartment and said stator compartment wherein the pressures of said dielectric liquid and said exterior liquid are in pressure transfer relation to eliminate pressure differential across said partition; a jacket surrounding said housing to receive a circulating heat exchange liquid in contact with the outer wall of said stator compartment; and a heat exchange coil within said jacket, said heat exchange coil being included in the circulation path of said exterior liquid in said rotor compartment.

20. A motor pump including in combination: a pump section having means for connection with an exterior pump liquid; a pump in said pump section; a motor housing having a thin walled partition defining separate rotor and stator compartments, said rotor compartment having fluid communication with said pump section, said stator compartment containing a body of dielectric liquid; shafting extending from said pump into said rotor compartment; a rotor carried by said shafting; bearings within said rotor compartment supporting said shafting, said bearings including an axial thrust bearing having a thrust disk secured to said shafting to rotate therewith, said thrust disk having radially extending ports therein to constitute an impeller element to circulate said exterior liquid throughout said rotor compartment; a closed chamber having fluid communication with said rotor compartment and said stator compartment wherein the pressures of said dielectric liquid and said exterior liquid are in pressure transfer relation to eliminate any pressure differential across said partition; a jacket surrounding said housing to receive a circulating heat exchange liquid in contact with the outer wall of said stator compartment; and a heat exchange coil within said jacket, said heat exchange coil being included in the circulation path of said exterior liquid in said rotor compartment.

21. A motor pump including in combination: a pump section having means for connection with an exterior pump liquid; a motor housing having a thin walled partition defining separate rotor and stator compartments, said rotor compartment having fluid communication with said pump section, said stator compartment containing a body of dielectric liquid; and a vertical closed cylindrical chamber in fluid communication at its top with said stator compartment and at its bottom with said rotor compartment wherein the pressures of said exterior liquid and said dielectric liquid are in pressure transfer relation to eliminate any pressure differential across said partition.

22. A motor pump including in combination: a pump section having means for connection with an exterior pump liquid; a pump in said pump section; a motor housing having a thin walled partition defining separate rotor and stator compartments, said rotor compartment having fluid communication with said pump section, said stator compartment containing a body of dielectric liquid; shafting extending from said pump into said rotor compartment; a rotor carried by said shafting; bearings within said rotor compartment supporting said shafting; an impeller element connected to said shafting to circulate said exterior liquid throughout said rotor compartment; and a vertical closed cylindrical chamber having fluid communication at its top with said stator compartment and at its bottom with said rotor compartment wherein the pressures of said dielectric liquid and said exterior liquid are in pressure transfer relation to eliminate pressure differential across said partition.

23. A motor pump including in combination: a pump section having means for connection with an exterior pump liquid; a motor housing having a thin walled partition defining separate rotor and stator compartments, said rotor compartment having fluid communication with said pump section, said stator compartment containing a body of dielectric liquid; a vertical closed cylindrical chamber having fluid communication at its top with said stator compartment and at its bottom with said rotor compartment wherein the pressures of said exterior liquid and said dielectric liquid are in pressure transfer relation to eliminate any pressure differential across said partition; a jacket surrounding said housing to receive a circulating heat exchange liquid in contact with the outer wall of said stator compartment; and a heat exchange coil within said jacket, said heat exchange coil being included in a circulation path for liquid in said rotor compartment.

24. A motor pump including in combination: a pump section having means for connection with an exterior pump liquid; a pump in said pump section; a motor housing having a thin walled partition defining separate rotor and stator compartments, said rotor compartment having fluid communication with said pump section, said stator compartment containing a body of dielectric liquid; shafting extending from said pump into said rotor compartment; a rotor carried by said shafting; bearings within said rotor compartment supporting said shafting; an impeller element connected to said shafting to circulate said exterior liquid throughout said rotor compartment; a vertical closed cylindrical chamber having means for fluid communication at its top with said stator compartment and at its bottom with said rotor compartment wherein the pressures of said dielectric liquid and said exterior liquid are in pressure transfer relation to eliminate pressure differential across said partition; a jacket surrounding said housing to receive a circulating heat exchange liquid in contact with the outer wall of said stator compartment; and a heat exchange coil within said jacket, said heat exchange coil being included in the circulation path of said exterior liquid in said rotor compartment.

25. A motor pump including in combination: a pump section having means for connection with an exterior pump liquid; a pump in said pump section; a motor housing having a thin walled partition defining separate rotor and stator compartments, said rotor compartment having fluid communication with said pump section, said stator compartment containing a body of dielectric liquid; shafting extending from said pump into said rotor compartment; a rotor carried by said shafting; bearings within said rotor compartment for supporting said shafting, said bearings including an axial thrust bearing having a thrust disk secured to said shaft to rotate therewith, said thrust disk having radially extending ports therein to constitute an impeller element to circulate said exterior liquid throughout said rotor compartment; a vertical closed cylindrical chamber having fluid communication at its top with said stator compartment and at its bottom with said rotor compartment wherein the pressures of said dielectric liquid and said exterior liquid are in pressure transfer relation to eliminate pressure differential across said partition; a jacket surrounding said housing to receive a circulating heat exchange liquid in contact with the outer wall of said stator compartment; and a heat exchange coil within said jacket, said heat exchange coil being included in the circulation path of said exterior liquid in said rotor compartment.

26. A motor pump including in combination: a pump section having means for connection with an exterior pump liquid; a pump in said pump section; a motor housing having a thin walled partition defining separate rotor and stator compartments, said rotor compartment having fluid communication with said pump section, said stator compartment containing a body of dielectric liquid; a shaft within said rotor compartment; a rotor carried by said shaft and bearings within said rotor compartment supporting said shaft, said bearings having an axial thrust bearing including a thrust disk secured to said shaft to rotate therewith, said thrust disk having radially extending ports therein to constitute an impeller element to circulate said exterior liquid throughout said rotor compartment.

27. A motor pump including in combination: a pump section having means for connection with an exterior pump liquid; a pump in said pump section; a motor housing having a thin walled partition defining separate rotor and stator compartments, said rotor compartment having fluid communication with said pump section, said stator compartment containing a body of dielectric liquid; shafting extending from said pump into said rotor compartment and carrying a rotor; bearings within said rotor compartment supporting said shafting; an impeller element secured to said shafting within said rotor compartment to circulate said exterior liquid within said rotor compartment; a jacket surrounding said housing adapted to receive a circulating heat exchange liquid in contact with the outer wall of said stator compartment; and a heat exchange coil within said jacket, said heat exchange coil being included in the circulation path of said exterior liquid in said rotor compartment.

28. A motor pump including in combination: a pump section having means for connection with an exterior pump liquid; a pump in said pump section; a motor housing having a thin walled partition defining separate rotor and stator compartments, said rotor compartment having fluid communication with said pump section, said stator compartment containing a body of dielectric liquid; shafting extending from said pump into said rotor compartment; a rotor carried by said shafting; bearings within said rotor compartment supporting said shafting, said bearings including an axial thrust bearing including a thrust disk, secured to said shafting to rotate therewith, said thrust disk having radially extending ports therein to constitute an impeller element to circulate said exterior liquid throughout said rotor compartment; a jacket surrounding said housing to receive a circulating heat exchange liquid in contact with the outer wall of said stator compartment; and a heat exchange coil within said jacket, said heat exchange coil being included in the circulation path of said exterior liquid in said rotor compartment.

References Cited in the file of this patent

UNITED STATES PATENTS

| Number | Name | Date |
|---|---|---|
| 1,269,909 | Cooper | June 18, 1918 |
| 1,347,732 | Cooper | July 27, 1920 |
| 1,736,002 | Frickey | Nov. 19, 1929 |
| 1,968,566 | Moran | July 31, 1934 |
| 2,020,513 | Mendenhall | Nov. 12, 1935 |
| 2,120,914 | Vogel | June 14, 1938 |
| 2,258,064 | Myers | Oct. 7, 1941 |
| 2,287,034 | Hollander | June 23, 1942 |
| 2,423,825 | Blom | July 15, 1947 |
| 2,427,656 | Blom | Sept. 23, 1947 |

FOREIGN PATENTS

| Number | Country | Date |
|---|---|---|
| 209,606 | Great Britain | Jan. 17, 1924 |